(12) United States Patent
Sawhney et al.

(10) Patent No.: US 9,106,687 B1
(45) Date of Patent: Aug. 11, 2015

(54) MECHANISM FOR PROFILING USER AND GROUP ACCESSES TO CONTENT REPOSITORY

(75) Inventors: Sanjay Sawhney, Cupertino, CA (US); Anantharaman Ganesh, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 719 days.

(21) Appl. No.: 13/286,952

(22) Filed: Nov. 1, 2011

(51) Int. Cl.
*G06F 12/14* (2006.01)
*G08B 23/00* (2006.01)
*H04L 29/06* (2006.01)

(52) U.S. Cl.
CPC .................................. *H04L 63/1416* (2013.01)

(58) Field of Classification Search
CPC ....... G06F 21/00; G06F 21/57; G06F 21/577; G06F 21/60; G06F 12/14; G08B 23/00
See application file for complete search history.

(56) References Cited

U.S. PATENT DOCUMENTS

| | | | |
|---|---|---|---|
| 7,904,303 B2 * | 3/2011 | Chien et al. | 705/1.1 |
| 2004/0095390 A1 * | 5/2004 | Arning et al. | 345/769 |
| 2011/0321175 A1 * | 12/2011 | Slater | 726/28 |
| 2012/0233191 A1 * | 9/2012 | Ramanujam | 707/758 |

* cited by examiner

*Primary Examiner* — Sangwoo Ahn
(74) *Attorney, Agent, or Firm* — Lowenstein Sandler LLP

(57) ABSTRACT

A mechanism for profiling user and group accesses to a content repository is described. The mechanism for profiling accesses may generate baseline profiles and determine if new access behavior deviates from the generated baseline profile. The deviations may be defined in terms of folder and/or user-group distances within a file-system/storage and/or organization hierarchy, respectively. The mechanism also includes an analytics engine for anomaly detection and a recommendation component for recommending access-permissions to files/folders.

20 Claims, 8 Drawing Sheets

MECHANISM FOR PROFILING USER AND GROUP ACCESSES TO CONTENT REPOSITORY

FIELD

Embodiments of the invention relate to file systems, and more particularly to the detection of profiling user and group access to a content repository.

BACKGROUND

Many organizations such as health care organizations, financial organizations, manufacturing organizations, etc. use data loss prevention (DLP) products to monitor and protect unstructured data. DLP products detect user activity on data, and determine whether the data contains confidential information. However, conventional DLP products do not determine normal user behavior or identify anomalous user behavior with regards to data accesses.

SUMMARY

A mechanism for profiling user and group accesses to a content repository includes a method that identifies relationships among groups of users in a user directory and among folders in a content repository. The method also receives an access log that includes records and analyzes the records in the access log to identify similarities between the records based on relationships between groups of users identified in the records and relationships. The method also generates baseline profiles for folder accesses based on the similarities, the generated profiles including proximity deviation thresholds. A threshold can comprise a numerical value, range of values, categorical levels (e.g., innocuous, moderate, severe). For example, a user to group and/or a folder to folder threshold may include a numerical distance value indicating when access action(s) could be considered anomalous compared to a baseline profile.

In one embodiment, the method comprises using baseline profiles for folder accesses to detect user behavior occurring outside the proximity deviation threshold. The proximity deviation thresholds can include a distance value indicating a number of folder directory edges traversed between folders being accessed. In one embodiment, the distance value is weighted according to similarities between the records based on relationships between folders identified in the records. In one embodiment, the method may calculate at least one of user to group distances or folder to folder distances based on the identified similarities from analyzing the records and generate permissions-recommendations according to the at least one of user to group distances or the folder to folder distances. The method may also compute at least one of a user to group distance or a folder to folder distance between a new access and the baseline profile. In one embodiment, the method can perform a remedial action in response to user behavior occurring outside the proximity deviation thresholds. For example, the remedial action in response may include removing group permissions to the specific folder.

In one embodiment, identifying similarities between the records can include clustering distances of groups between the folder accesses, determining affinity groups for folders in the content repository and determining affinity folders for at least one of a given user, a given group or a given organization unit. In one embodiment, the baseline profile comprises an affinity folder for a group that the user belongs to. The affinity folder may comprise folder(s) frequently accessed by the group. With a defined affinity folder, the folder to folder distance calculation may determine a distance between the affinity folder and the specific folder. Similarly, an affinity group may include a group that most frequently accesses a specific folder. In one embodiment, the user to group distance may be computed by determining a distance between the group that the user belongs to and the affinity group.

In analyzing the records in the access log to identify similarities between the records based on relationships between groups of users identified in the records and relationships between folders identified in the records, the method can include analyzing whether groups are within an organization unit among the groups of users in the user directory and applying weights indicating groups are within the organization unit among the groups of users in the user directory. In one embodiment the method may also analyze whether folders are within a volume mount point and apply weights indicating folders are within the same volume mount point. The mechanism for profiling user and group access further includes a method for generating baseline profiles where the baseline profile may be for at least one of folder read accesses, folder write accesses or folder modify accesses.

In one embodiment, the method for profiling user and group accesses may include receiving a baseline profile for folder accesses in a user directory of a given group based on records in an access log, comparing new accesses to the baseline profile for folder accesses of the given group, detecting an access deviation upon comparing new accesses to the baseline profile for folder access of the given group and performing a remedial action in response to the detected access deviation. In one embodiment, performing the remedial action in response to the detected access deviation can further include transmitting an administrator alert in response to the detected access deviation and removing group permissions to a given folder in the user directory. The method may also calculate distances based on the identified similarities from analyzing the records. In one embodiment, the method may generate permissions-recommendations according to the user to group distances.

The method can also compare accesses to the baseline profile for folder accesses of the given group by receiving an access deviation threshold for determining whether the new accesses qualify as access deviations and calculating distances between new folder accesses and the baseline profile to determine if the access deviation threshold has been met. In one embodiment, the method can update the baseline profile with weights based on relationships between groups of users in the user directory and use the weights based on relationships between groups of users in the user directory to calculate distances between new folder accesses and the baseline profile to determine if an access deviation threshold has been met.

A system comprises a processor and a memory coupled to a processor. The memory can store executable instructions that when executed by the processor, cause the processor to identify relationships among groups of users in a user directory and identify relationships among folders in a content repository. The system can also receive an access log and analyze the records in the access log to identify similarities between the records based on relationships between groups of users identified in the records and relationships between folders identified in the records. The system can also generate baseline profiles for folder accesses based on the similarities. In one embodiment, the generated profiles can include proximity deviation thresholds. In one embodiment, the system can use the baseline profiles for folder accesses to detect user behavior occurring outside the proximity deviation thresholds.

In one embodiment, the system can include a client device that accesses files in the content repository and an analytics engine application communicating with the client device. The system may further include a client device with an analytics engine client application. The analytics engine can also include a permissions component, an anomaly detection component, a clustering component, a recommender component a distance component and an endpoint component.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
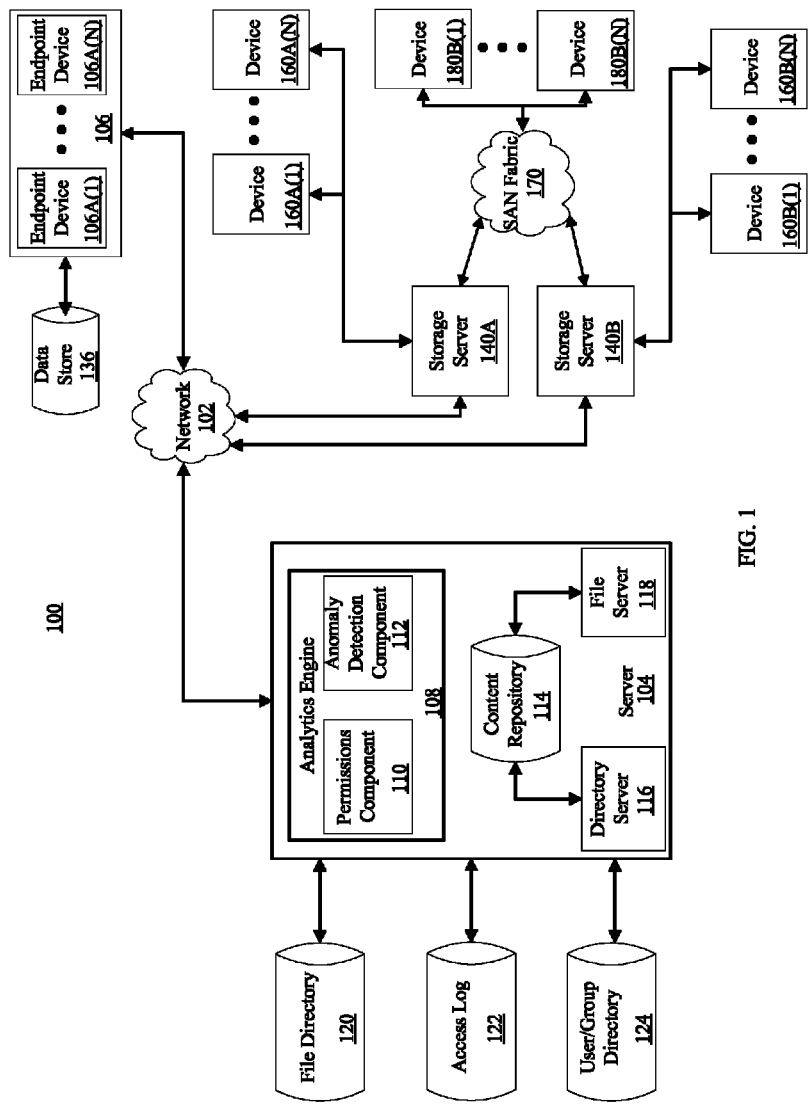
FIG. 1 is one embodiment of a block diagram of an exemplary network architecture.

The innovations described herein provide novel solutions for data loss prevention systems. The identification of discriminating attributes in information systems allow for administrators to more accurately represent normal user behavior through baseline profiles. The techniques described below advantageously leverage baseline profiles with unique detection algorithms. The unique detection algorithms minimize the number of false positives returned and therefore enhance the ability for administrators to scale the described innovations onto data sets with exponential growth. In addition, the innovations described below advantageously provide a flexible managerial tool set (e.g., remedial permissions) enforceable with varying levels of granularity.

In the following description, numerous details are set forth. It will be apparent, however, to one skilled in the art, that the present invention may be practiced without these specific details. In some instances, well-known structures and devices are shown in block diagram form to illustrate the appropriate detail.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, a sequence of steps leading to a desired result. Data can take the form of electrical or magnetic signals capable of being stored, transferred, combined, compared and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "receiving", "identifying", "generating", "computing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The detailed description also refers to a system for performing the operations herein. This system may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the method steps. The structure for a variety of these systems will appear from the description below. In addition, the present invention is not described with reference to any particular programming language. It will be appreciated that a variety of programming languages may be used to implement the teachings of the invention as described herein.

Reference is made to the accompanying drawings that form a part hereof, and in which is shown by way of illustration specific embodiments in which the invention may be practiced. It is to be understood that other embodiments may be utilized and structural changes may be made without departing from the scope of the present invention.

FIG. 1 is a block diagram depicting a network architecture 100 in which client systems 106, as well as storage servers 140A, 140B (any of which can be implemented using computer system 800), are coupled to a network 102. The architecture 100 includes a server 104 comprising an analytics engine 108, a content repository 114, a directory server 116 and a file server 118. The server 104 may also be in communication with a file directory 120, an access log 122 and a user/group directory 124. As illustrated, server 104 may be connected to multiple storage servers 140A-140B and/or endpoint device(s) 106A(1)-106A(N) via a network 102. Storage server 140A is further depicted as being in communication with storage devices 160A(1)-(N), and storage server 140B is depicted as being in communication with storage devices 160B(1)-(N). Storage servers are also connected to a Storage Area Network "SAN" fabric 170, although connection to a storage area network is not required for operation. SAN fabric 170 supports access to storage devices 180(1)-(N) by storage servers 140A and 140B, and so by endpoint devices 106A(1)-106A(N).

With reference to computer system 800, network interface device 822, or some other method can be used to provide connectivity from each of endpoint devices 106. Endpoint devices 106 are able to access information on storage server(s) 140A, 140B using, for example, a web browser or other client software (not shown). Such a client allows endpoint devices 106 to access data hosted by storage server 140A or 140B or one or more storage devices 160A(1)-160A(N), 160B(1)-160B(N) and 180B(1) 180B(N).

Server 104 can include one or more computer servers. In one embodiment, the server includes a processor, a hard drive and memory. The server 104 can include a data loss prevention system running one of a MICROSOFT® WINDOWS® OS, a RED HAT® Enterprise Linux OS and/or the like. The analytics engine 108, described below, includes a permissions component 110 and an anomaly detection component 112. The permissions component 110 can grant, modify and/or revoke permissions for a user, group, organization unit and/or for a particular data object, e.g., a file, folder, drive and/or the like. The anomaly detection component 112 can detect deviations from baseline profiles based on defined parameters and/or thresholds.

Content repository 114 can include a directory server 116 and a file server 118. The content repository 114 can include one or more databases hosting data in the directory server 116. Directory server 116 can include a server running an installation of MICROSOFT Active Directory although other types of directory software can be used. File Server 118 can include a server running content management system software. File directory 120 can be a file, graph, a tree, a table, or other data structure or a collection of data structures representing the content of the file server. The user/group directory 124 can be a file, table tree, graph or other data structure or data structures representing the content of the directory server.

In one embodiment, the user/group directory 124 can be a hierarchical structure that stores information about objects on network 102. Objects include shared resources such as servers, shared volumes, and printers; network user and computer accounts; as well as domains, applications, services, security policies. The user/group directory can store information about a particular type of object or shared resource (e.g., a file and/or folder residing in file server 118). For example, the user/group directory can store a user's name, password, e-mail address, phone number, and so on, for a user and group accounts. In one embodiment, the user/group directory may store information about a particular user or group. For example, the user/group directory may also store information such as a set of folders and/or groups the user belongs to or has permissions to access. The user/group directory may also store information similar information about a group, namely the users, folders, files and associated permissions for the group.

In one embodiment, the user/group directory includes a hierarchy of groups. A user may belong to one or multiple groups. Each group may have a parent group and/or one or more child groups. For example, a user may belong to group A, which may be a subgroup of group B, which may be a subgroup of group C, and so on.

Network 102 can include a set of nodes and/or network interfaces that accept, communicate, and/or connect to a communications network. Over the communications network, the server 104 is accessible through network interfaces on remote clients (endpoint device(s) 106) by a user. For example, a network interface may include a telnet command line, an file transfer protocol (FTP) connection, a virtual private network (VPN) connection, a virtual desktop connection, a secure gateway and/or the like. Network interfaces allow users to employ connection protocols such as, but not limited to, Transmission Control Protocol/Internet protocol (TCP/IP), Internet Protocol Security (IPSec), User Datagram Protocol (UDP), Wireless Access Protocol (WAP), Global System for Mobile communications protocol (GSM) and/or the like, to send data packets over Ethernet, Gigabit Ethernet, Fiber Optics, and wireless protocols, such as IEEE 802.11a-x, BLUETOOTH® and/or the like. A communications network may also be any one and/or the combination of a Local Area Network (LAN); a Metropolitan Area Network (MAN); and a Wide Area Network (WAN). Further, multiple network interfaces may be used to engage with various communications network types. For example, multiple network interfaces may be employed to allow for the communication over broadcast, multicast, and/or unicast networks.

Endpoint device 106 can include be a personal computer (PC), a laptop, a mobile phone, a server computer or any other computing device. The endpoint devices 106A(1)-106A(N) each run an operating system (OS) that manages hardware and software of the endpoint devices. The OS may be, for example, MICROSOFT® WINDOWS®, LINUX®, SYMBIAN®, APPLE's® OS X®, SOLARIS®, etc. One or more applications run on top of the OS and perform various operations that involve accessing, moving, or otherwise manipulating data residing in a local data store 136 and/or network storage 170. For example, the applications may include a CD or DVD burning application, an email application, a web browser, an instant messaging application, a printing application, a print screen function and/or the like. In one embodiment, the applications perform the operations in response to receiving user instructions.

Each endpoint device 106 may include and/or be connected to a data store 136, which may be a hard disk drive, solid state drive (SSD), tape backup, optical drive, volatile memory (e.g., random access memory (RAM)), or other storage device. The data store 136 may be a private data store that is not shared with other endpoint devices on the network 102. Each endpoint device(s) 106 may additionally have access to network storage 170 provided by one or more storage servers.

Figure 2:
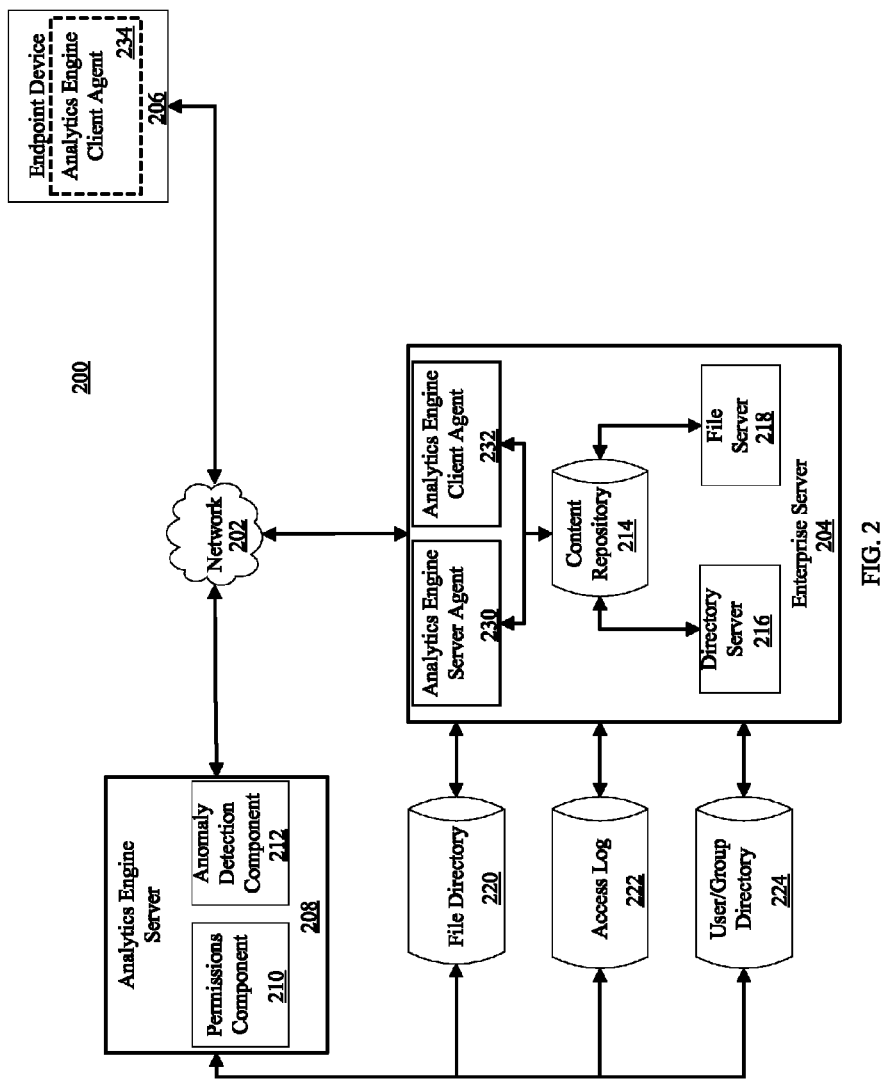
FIG. 2 is one embodiment of a block diagram of an exemplary network architecture.

FIG. 2 is one embodiment of a block diagram of an exemplary network architecture 200. The architecture 200 includes an enterprise server 204 comprising an analytics engine server agent 230, an analytics engine client agent 232, a content repository 214, a directory server 216 and a file server 218. The server 204 can also be in communication with a file directory 220, an access log 222 and a user/group directory 224. As illustrated, server 204 can be connected to endpoint device(s) 206 and an analytics engine server 208 via a network 202.

Enterprise server 204 can include one or more server computers running one or more operating systems. In one embodiment, the analytics engine server agent 230 resides on one server and the analytics engine client agent 232 resides on a second server. Analytics engine server 208 can be a server separate from the enterprise server 204, although it does not have to be. In one embodiment, the endpoint device 206 can have an analytics client agent 234 installed. The analytics client agent 234 can be in communication with the analytics engine server 208 and/or the enterprise server via the network 202. In one embodiment, the analytics engine server engine agent 230 receives information from the content repository 214, directory server 216, file server 218, the illustrated directories 220, 224, client(s) 206, log(s) 222 and servers 204, 208.

The information received may sent to components, e.g., permissions component 210 and anomaly detection 212 for further processing. The analytics client agent 232 may collect access information about a remote client and/or user. In one embodiment, the client agent 234 is operable to receive instructions from the server to enforce a remedial permissions action.

Figure 3:
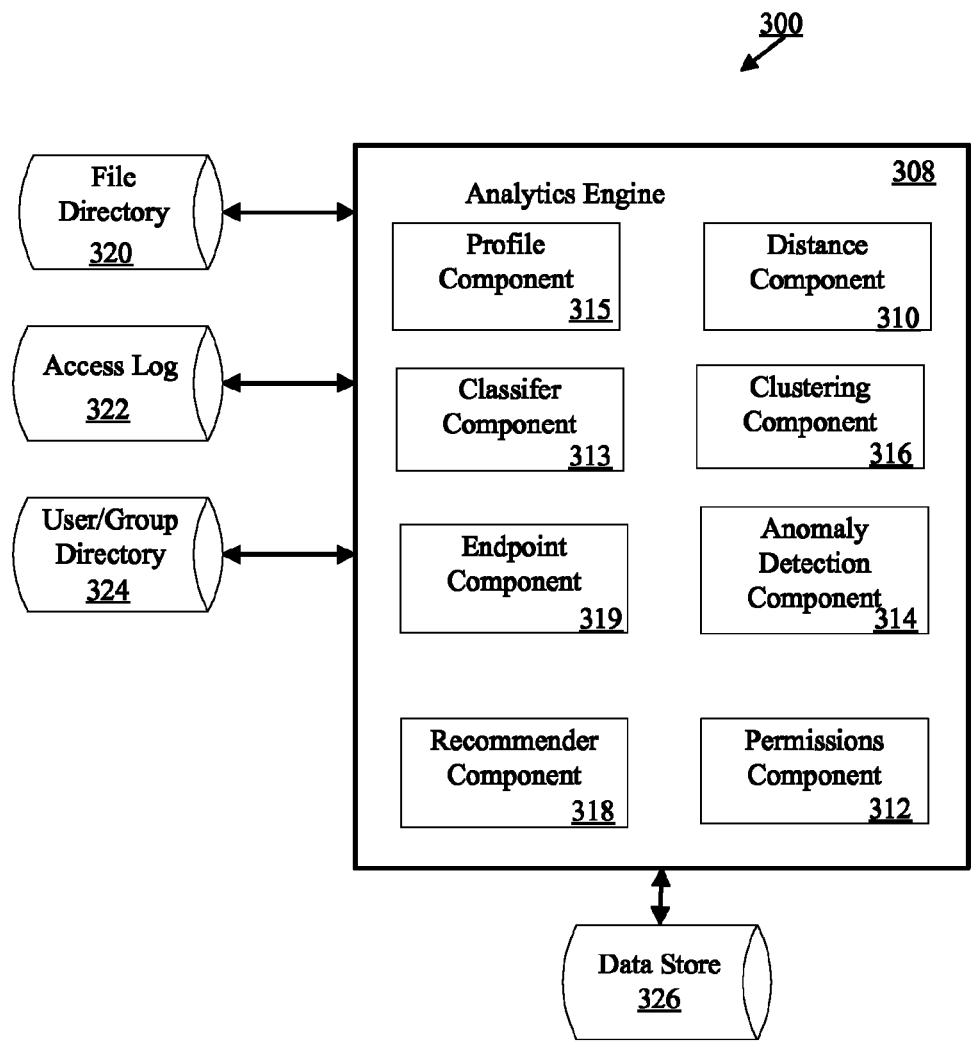
FIG. 3 is one embodiment of a block diagram of an exemplary software architecture.

FIG. 3 is one embodiment of a block diagram of an exemplary software architecture 300. In one embodiment, analytics engine 308 corresponds to analytics engine 108 of FIG. 1 and/or analytics engine 208 of FIG. 2. The software architecture 300 includes an analytics engine 308. The analytics engine 308 comprises a permissions component 312, an anomaly detection component 314, a profile component 315, a classifier component 313, a clustering component 316, a recommender component 318, a distance component 310 and an endpoint component 319. Also illustrated in communication with the analytics engine 308 is a file directory 320, an access log 322 and a user/group directory 324.

The analytics engine 308 uses repository access logs, queries enterprise directories for user information, group information, organization unit (OU) information and their memberships and reads access control settings on the content repository to perform one or more actions. The actions may include adjusting folder access permissions and/or detecting anomalies (e.g., deviations from an access baseline profile). The repository logs 322 provide access histories for users and groups over a temporal frame. In one embodiment, the analytics engine 308 analyzes access histories to advantageously predict future access patterns. The analytics engine 308 can process data by analyzing each access for each given folder activity. The analytics engine 308 can further include a set of suggested access control lists (ACL). The access control lists can be ranked based on an organization's security policy and/or security sensitivity of a data for a specific group within an organization unit. ACL's within the set of suggested ACLs can be characterized by the analytics as tight, more restrictive permissions to content items in the repository, and loose, more lenient permissions to content items in the repository.

The access histories and future access patterns can be stored in memory as a file, graphical report or any suitable data structure. In one embodiment, a log record includes a file/folder name identifier, an operation (e.g., create, delete, read, write, modify, rename), a security identifier (e.g., user accessing a file), a timestamp (e.g., time/date), IP address/location from where the access was made and/or the like. In one embodiment, output from the analytics engine analyses can be transmitted to the recommender component 318 and the anomaly detection component 314. In one embodiment, the output of the analytics engine can be passed to the recommender component 318 via any available inter-process communication mechanism like networks, shared-memory, files on storage devices and/or the like.

The profile component 315 generates, maintains and updates profile data based on the queried directories, access logs and/or control settings. A baseline profile can include a set of behavioral attributes and a set of contextual attributes. Behavioral attributes can include a user's read counts, write counts and delete counts. These counts can be captured over a given time interval. For example, a user's counts may be captured every day, seven days, thirty days or longer. Contextual attributes can include a user identifier, a group identifier, an IP address, a content item identifier (e.g., a document number), a content item type (e.g., public, confidential, privileged) and/or the like.

In one embodiment, the profile component 315 identifies basic groups to which a user belongs. For example, a user is in Group A and Group A may be a subgroup of Group B, which may be a subgroup of Group C, and so on. Therefore, the user may belong to groups A, B and C. A group relative nesting distance (Group RND) can be defined as a distance from a most defined group of a user (e.g., a group to which a user belongs to that has no subgroups to which the user also belongs). For example, Group A may have a Group RND 0, Group B may have a Group RND 1 and Group C may have a Group RND 2. The profile component 315 may store the group information and relative nesting distances with a user profile. To establish a baseline profile, the profile component can query and/or receive access actions associated with users from an access log. The profile component 315 can also query and/or receive access actions for a set of users in a given group. The access actions can be clustered with a combination of contextual and behavioral attributes described above. In one embodiment, the access actions are clustered based on most frequently accessed folders for users and/or groups (defined as an affinity folder for the user or group) and/or based on a group or user that most frequently accesses a folder (defined as an affinity group or affinity user for the folder).

Advantageously, the profile component 315 may also maintain user and folder distance data descriptive of the distance between prior access actions and new access actions. Such distances may be calculated by the distance component 310. In one embodiment, distance data includes a distance between a user or group associated with a folder access and an affinity group for that folder that was accessed. In one embodiment, distance data includes a distance between a folder accessed by a user or group and an affinity folder for that user or group.

The distance component 310 calculates distances between access actions, folder affinities and/or group affinities in the baseline profile and new access actions. In one embodiment, the distance component 310 can determine proximity and distance, where proximity may be understood as the inverse of distance. For example, distance component 310 can determine the proximity of two groups (G1 and G2) in an organization directory hierarchy (represented as a binary tree). For example, Group POD=Group Proximity Object Distance=Min number of edges to traverse from G1's distinguished name to G2's distinguished name. In one embodiment, G1 is an affinity group for a folder and G2 is a group associated with a specific access event. In one embodiment, the calculation of group proximity object distance can apply different weights to different directory edges. For example, the analytics engine could bias edges that connect different organization units more heavily relative to the edges that are connecting objects within one organization unit.

In one embodiment, the distance component 310 can, define, for a given file access, the folder relative nested distance (Folder RND) for various folders, where a Folder RND of a Current folder being accessed=0, a Folder RND of a Parent of current folder=1, a Folder RND Parent of parent folder=2, and so on. In one embodiment, the folder hierarchy may group related content together. Branches farther up the folder hierarchy could likely lead to less similar content and could be measured, by the distance component 310 with a higher numerical value.

The distance component 310 can also determine the proximity of two folders F1 and F2 (Folder POD=Folder Proximity Object Distance)=Min number of edges traversed in navigating from F1 to F2. F1 may be, for example, a folder accessed in the given file access and F2 may be an affinity folder for a user or group performing the access. In one embodiment, for folder proximity object distance, folder hierarchy edges may have different weights. For example, the distance component could bias edges that cross mount points more heavily relative to the edges that are connect folders within a single mount point. In one embodiment, the data processed by the profile component 315 and the distance component 310 can be sent to the classifier component and/or clustering component for further processing.

The classifier component 313 stores the functions for one or more trained or untrained classifiers. A trained classifier uses a data set of training examples to be taken as input vector variables to a classifier function, e.g. a regression function. The classifier component 313 can determine input features, the structure of a learned function and a corresponding learning algorithm. In one embodiment, classifier component 313 can include Bayes classifiers, Tree Classifiers, Rules based classifier and/or meta classifiers. In one embodiment, the classifier component may send input features, the structure of the learned function and corresponding learning algorithm to the clustering component 316. Advantageously, the analytics engine 308 may use a hybrid approach. For example, analytics engine may implement trained and untrained classifiers with supervised and unsupervised machine learning algorithms.

The clustering component 316 performs clustering based on the access log 322, where the clustering refers generally to collecting a set of objects into groups called clusters. The clustering component 316 can include a variety of clustering algorithms, such as, CLOPE, Cobweb, DBScan, EM, FarthestFirst clusterer, Filtered Clusterer, Hierarchical Clusterer, OPTICS, sIB, SimpleKMeans, XMeans and/or the like. In one embodiment, the clustering component 316 may select a temporal frame of access actions, e.g. a week, a user identifier, a group identifier and a document identifier for clustering. As one of ordinary skill in the art will appreciate, different permutations of available attributes over varying temporal frames can result in more or less valuable data clusters. In one embodiment, the clusters can be transformed into visually intuitive representations, e.g., plots and graphs.

Clustering plots can provide affinity groups for specific folders, as well as affinity folders for a specific user identifier, group identifier or organization unit. The clustering can be used to detect an anomaly between a new access and a baseline profile wherein the baseline profile is established using clustering for accesses observed during a training period. The clustering plots can also provide a delta between the actual configured permissions on a given folder and the actual accesses. The profiles developed using the techniques above can be developed independently for each access operation (e.g., read, write, modify, execute) or as an aggregate where the analytics engine doesn't make a distinction between the operation.

The analytics engine 308 can also refine the clusters by filtering. In one embodiment, filtering can repeat clustering after eliminating user groups that can be safely eliminated based on a folder's Access Control Lists and inheritance masks. For example, if one of the user's groups has no access to the file/folder being accessed, then that group can be eliminated from consideration.

In one embodiment, the clustering component 316 can establish clusters using Distance [A1, A2]=Euclidean distance using group proximity distance and folder proximity distance, where D[A1, A2] is the distance between two accesses A1 and A2. For example, the Euclidean between A1 and A2 is the length of the line segment connect them ($\overline{A1,A2}$). In Cartesian coordinates, if A1=(a1$_1$, a1$_2$, a1$_3$, a1$_4$, a1$_5$, ..., a1$_n$) and A2=(a2$_1$, a2$_2$, a2$_3$, a2$_4$, a2$_5$, ..., a2$_n$) are two points in Euclidean n-space, then the distance from a1 to a2 or from a2 to a1 is given by:

$$d(a1, a2) = d(a2, a1) =$$
$$\sqrt{(a2_1 - a1_1)^2 + (a2_2 - a1_2)^2 + \cdots + (a2_n - a1_n)^2} = \sqrt{\sum_{i=1}^{n} (a2_i - a1_i)^2}$$

The endpoint component 319 can include a client agent for monitoring and storing access events to the data store 326. The endpoint component 319 may connect to the server 104 and/or enterprise server 204 of FIGS. 1 and 2 respectively. When connected to a server, the endpoint component can access files in a shared directory. These access events can be categorized generally as a read access, a write access and/or a modify access event. The endpoint component can communicate these access events to the analytics engine through an analytics engine client agent 234, shown in FIG. 2. In one embodiment, the access events received from the analytics engine client agent can be processed by the anomaly detection component 314 or they may be stored for later processing.

Anomaly detection component 314 detects deviations between the baseline profile and most recent accesses. In one embodiment, the anomaly detection component 314 sends requests for calculating the distance between two groups, two folders or any other object to the distance component 310. In response to the requests, the distance component 310 may return an integer value, a floating point value, a graph value and/or the like. The anomaly detection component can also alert the administrator through the recommender component 318.

The recommender component 318 detects deviations between the actual permissions settings and the user-to-folder affinity and folder-to-user affinity. For example, user-folder affinity may be defined as:

$$\frac{1}{\varepsilon + D(g, g^1)}$$

where D(g, g$^1$)) is Distance between the g, the user's most defined group and g$^1$, group with most past access for the given folder. The recommender component 318 can also recommend restricting overly loose entitlements. For example, the recommender component 318 may send a command or instruction to the permissions component 312 indicating a restriction or the granting of permissions to a given content item for a user or a group of users through the permissions component 312.

In one embodiment, the analytics engine can use the above components illustrated in FIG. 3, as well as other components, to detect anomalies and to make recommendations based on the detected anomalies. The components of the analytics engine 308 may store information in a data store 326. A data store may be a persistent storage unit. A persistent storage unit may be a local storage unit or a remote storage unit. Persistent storage units may include a magnetic storage unit, optical storage unit and/or a solid state drive (SSD). A solid-state drive (SSD) is a data storage device that uses solid-state memory to store persistent data and provide access in the same manner of a block I/O hard disk drive. SSDs may use one or more microchips to retain data in non-volatile memory chips. In one embodiment, the analytics engine components store access log information, profile information and analytics in the data store 326

Figure 4:
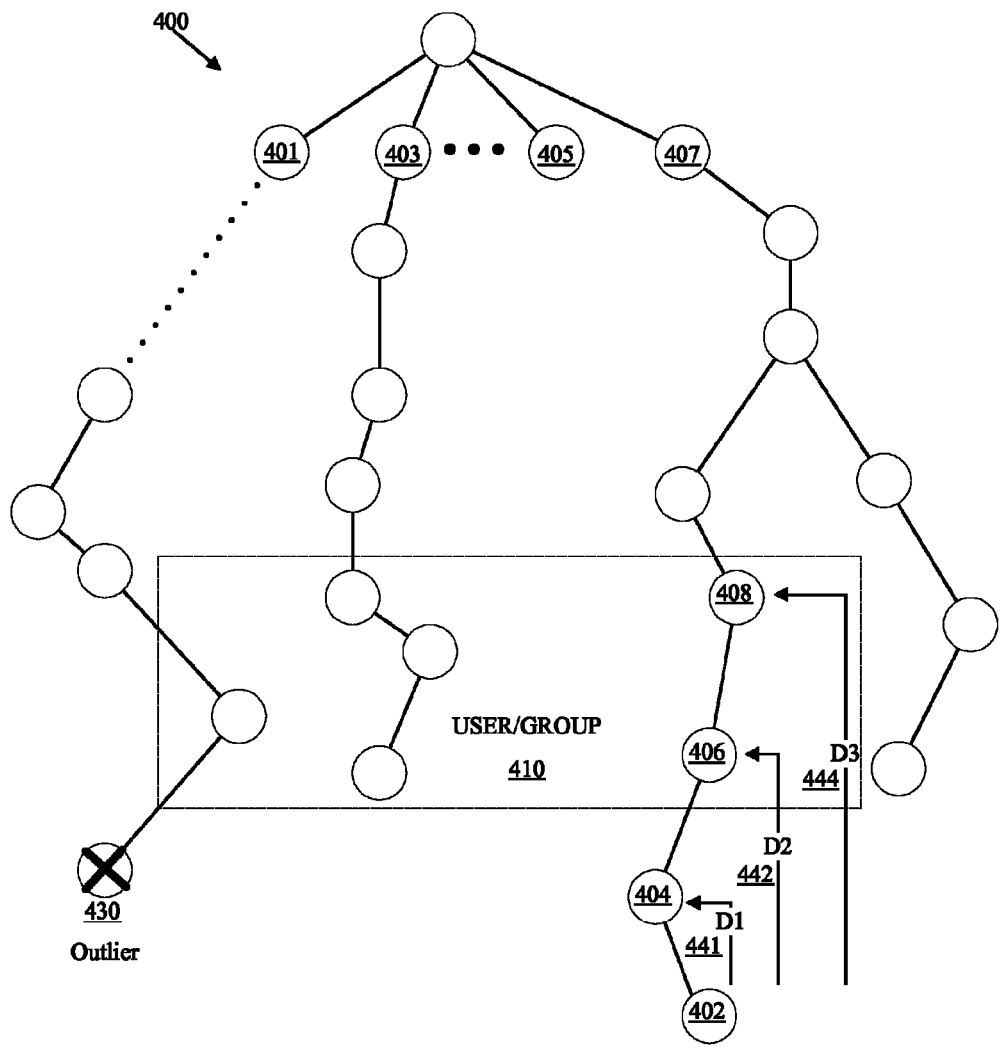
FIG. 4 is one embodiment of a graph illustrating a user-group directory.

FIG. 4 is one embodiment of a graph illustrating a user-group directory 400. In one embodiment, node(s) 401, 403, 405 and 407 represent different organization units. The nodes in USER/GROUP 410 can represent the affinity groups for a given user. In one embodiment, D1 441 represents the distance between Group A 402 and Group B 404. D2 442 can represent the distance between Group B 404 and Group C 406. D3 444 can represent the distance between Group C 406 and Group D 408. As illustrated in FIG. 4, outlier node 430 is marked with an X. Node 430 can represent a group falling outside of the user/groups identified in the baseline profile and/or as an affinity user/group.

Figure 5:
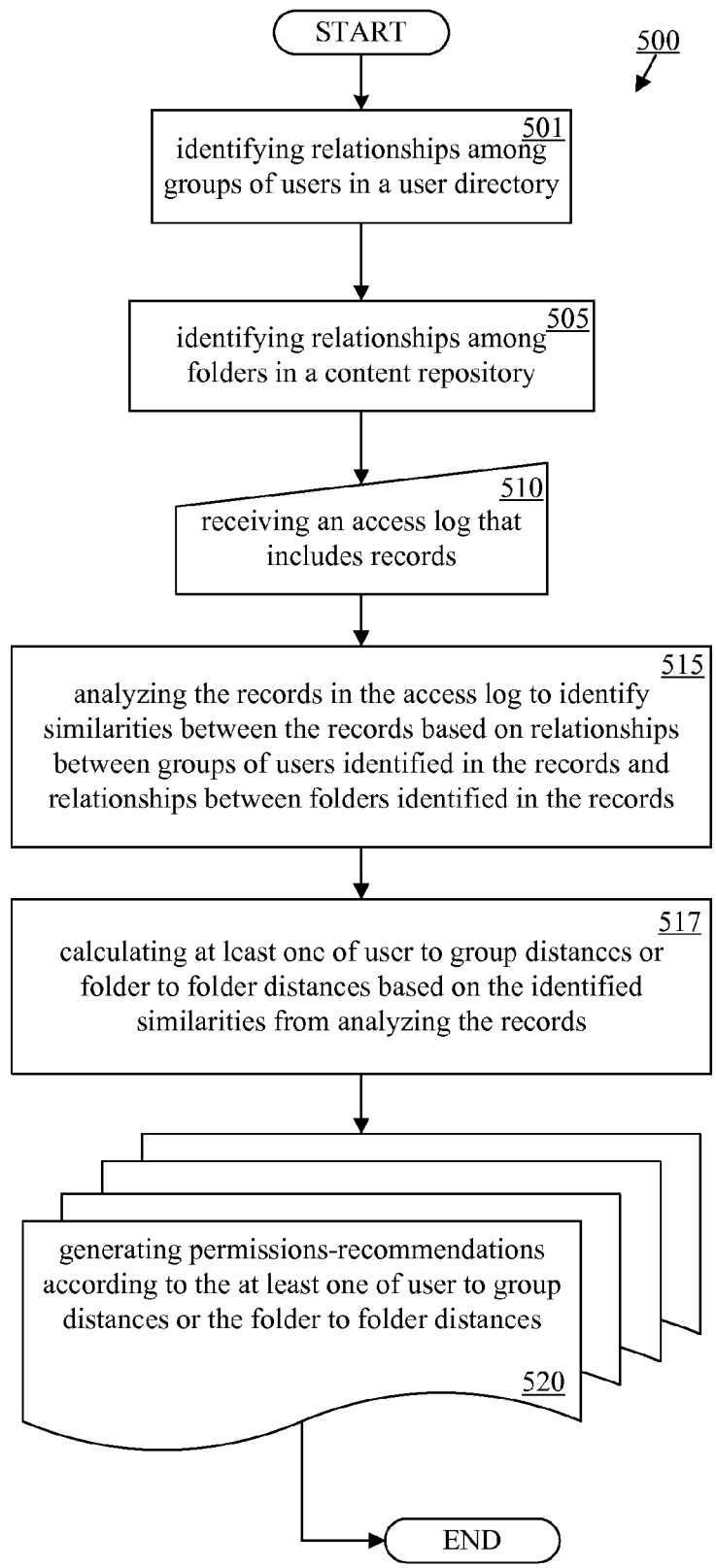
FIG. 5 is one embodiment of a flow diagram for profiling user and group accesses to a content repository.

FIG. 5 is one embodiment of a flow diagram for profiling user and group accesses to a content repository. In one embodiment, the flow diagram includes processing logic for identifying relationships among groups of users in a user directory as shown in block 501. Block 505 includes processing logic for identifying relationships among folders in a content repository. Block 510 includes processing logic for receiving an access log that includes records. Block 515 includes processing logic for analyzing the records in the access log to identify similarities between the records based on relationships between groups of users identified in the records and relationships between folders identified in the records. In one embodiment, processing logic can perform operations at Block 517, namely calculating at least one of user to group distances or folder to folder distances based on the identified similarities from analyzing the records. Block 520 includes processing logic for generating permissions-recommendations according to the at least one of user to group distances or the folder to folder distances.

In one embodiment, user to group distance can be calculated by counting the number of traversals from a user's defined group to a group associated with the folder being accessed, e.g., an affinity group of the folder. Similarly, folder to folder distance can be calculated by counting the number of traversals from a given folder (e.g., a folder previously accessed or an affinity folder for the user's defined group) and a target folder (folder currently being accessed). Counting the number of traversals may include receiving a user directory or folder directory schema, by receiving a hierarchical data structure, and/or by assigning discrete values for distances between user and group and between folders. Other mechanisms for calculating distances from nodes on a graph will be appreciated by those of ordinary skill in the can also be used with departing from the scope of the claimed innovations.

Figure 6:
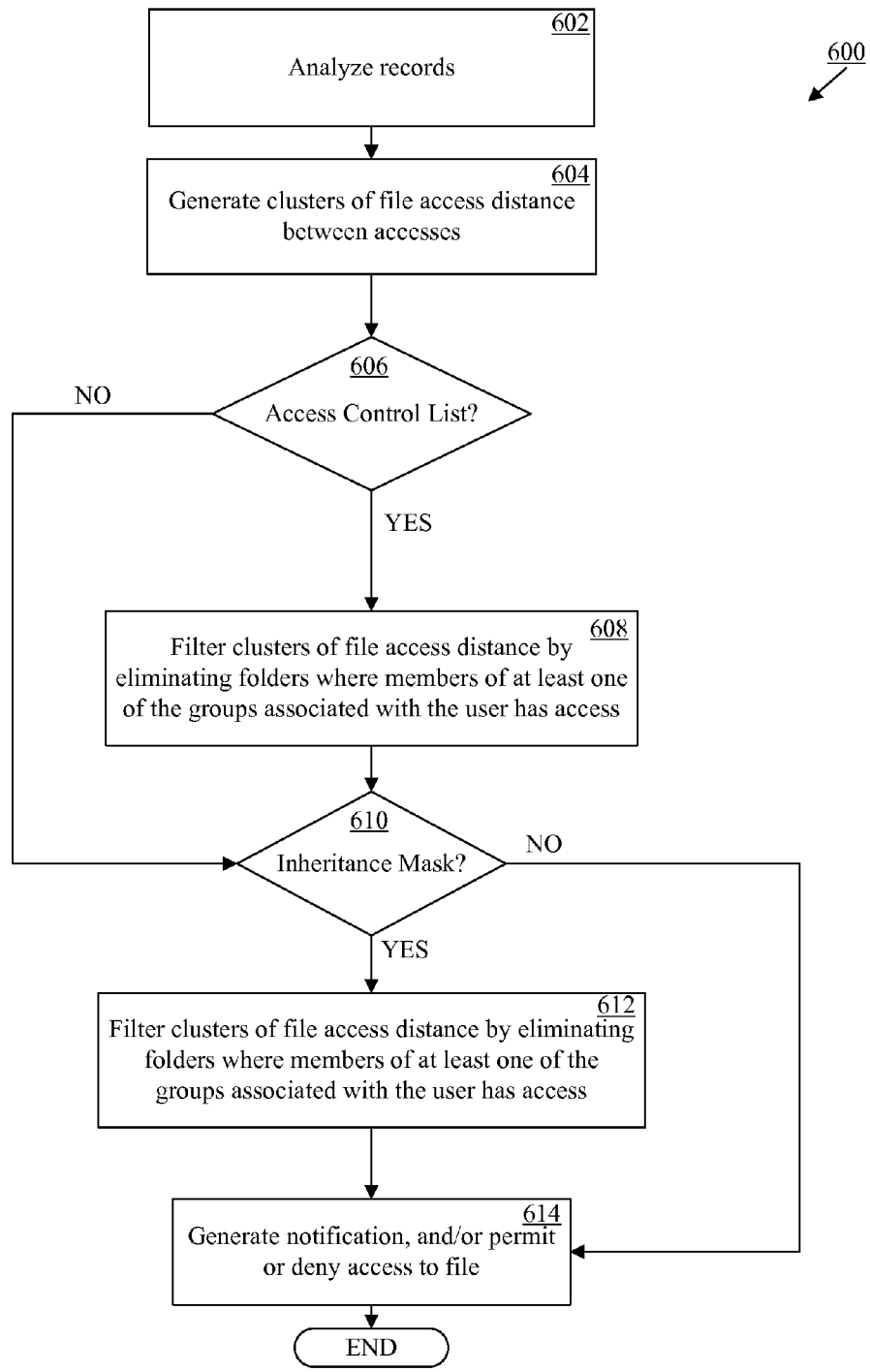
FIG. 6 is one embodiment of a flow diagram for profiling user and group accesses to a content repository.

FIG. 6 is one embodiment of a flow diagram for profiling user and group accesses to a content repository. Block 602 includes processing logic for analyzing records from the access log, user-group directory and/or file server. Block 604 includes processing logic for generating clusters of file access distance between accesses 604. At block 606, a check is performed to determine if an object (e.g., a user, group and/or the like) is part of the access control list. If the object is in the access control list, the flow can filter clusters of file access distance by eliminating folders when members of at least one of the groups associated with the user has access, block 608. At block 610, a check is performed to determine if an object is within an inheritance mask. If the object falls within the inheritance mask, the object can filter clusters of file access distance by eliminating folders where members of at least one of the groups associated with the user has access 612. At block, the flow includes processing logic to generate a notification and/or permit or deny access to a file, a folder, a group of folders and/or a drive.

Figure 7:
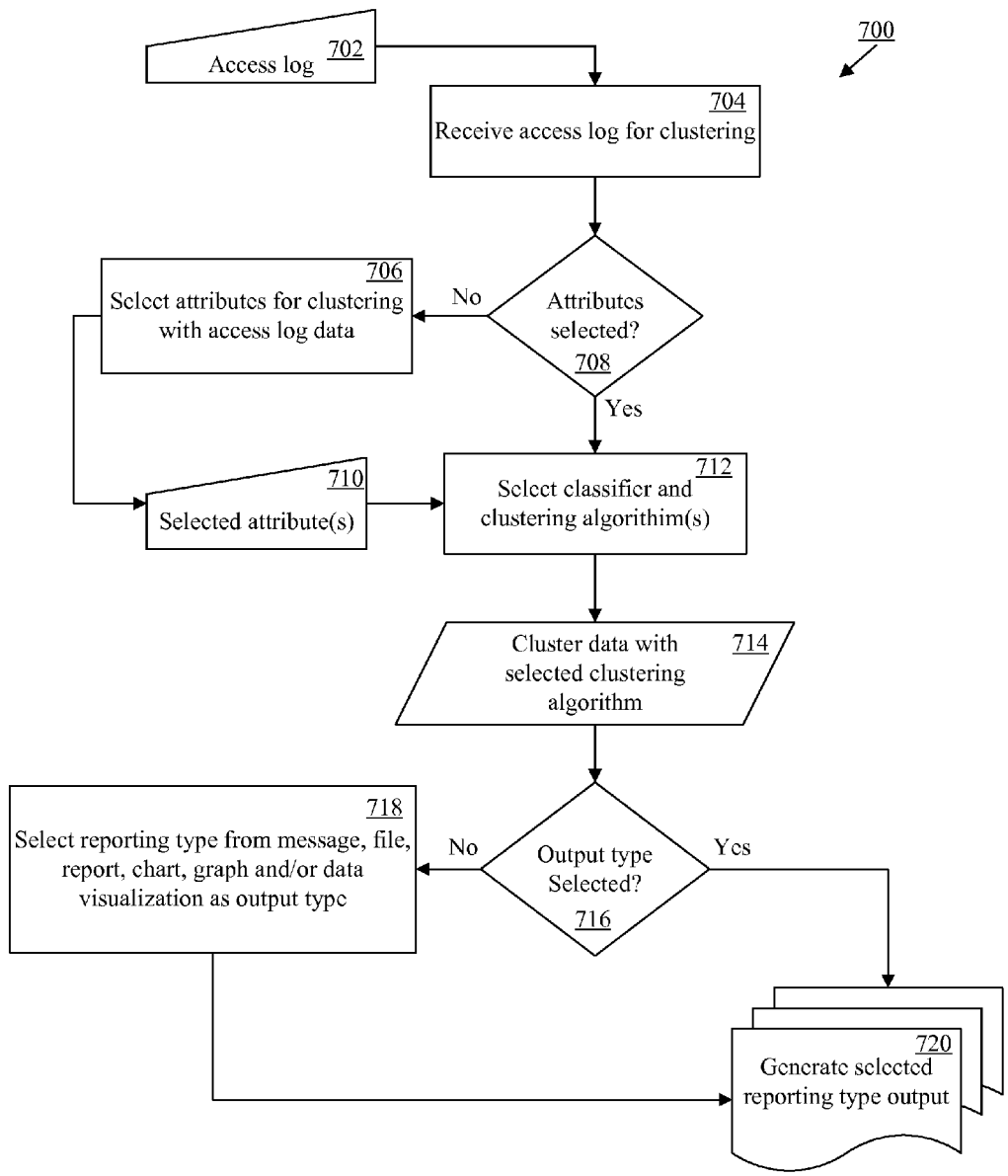
FIG. 7 is one embodiment of a flow diagram for profiling user and group access to a content repository.

FIG. 7 is one embodiment of a flow diagram for profiling user and group access to a content repository. Processing logic may being by receiving an access log 702. The received access log is prepared for clustering 704 wherein preparation may include converting raw data into a structured format, e.g., a database table(s). Processing logic can check to determine if attributes were selected. If attributes were not selected, flow may provide for the selection of attributes 706 for clustering with access log data. If attributes were selected, the selected attributes 710 may be sent to a prompt 712 for selecting a classifier and clustering algorithm. Classifier may include a Bayes classifier, Tree Classifier, a Rules based classifier and/or a meta classifier.

Clustering algorithms may include CLOPE, Cobweb, DBScan, EM, FarthestFirst, FilteredClusterer, HierarchicalClusterer, OPTICS, sIB, SimpleKMeans, XMeans and/or the like. In one embodiment, the clustering produces affinity folders for users, groups and/or OUs. Clustering may also produce affinity groups, affinity users and/or affinity OUs for one or more folders. An affinity folder may be a folder that is frequently accessed by a group, user or OU, and an affinity group may be a may be a group that frequently accesses a folder. In one embodiment, an affinity folder for a group is a folder most frequently accessed by that group, and an affinity group for a folder is a group that most frequently accesses that folder. Processing logic can then cluster 714 the received access log and selected attributes based on the selected clustering algorithm. At block 716, flow can check if an output type selection was made. If an output type selection was not made, processing logic may provide for a selection of reporting type from message, file, report, chart, graph and/or other data visualization techniques 718. Processing logic may then proceed to generate output based on the selected reporting type 720.

Figure 8:
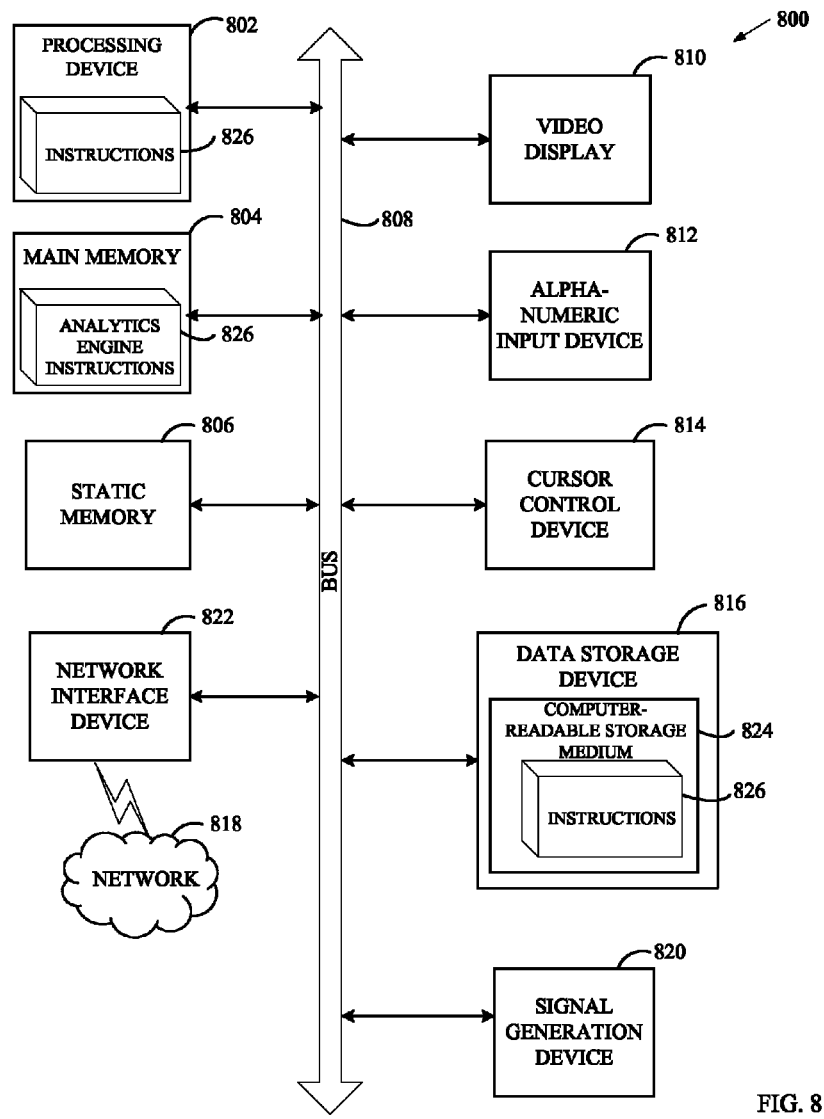
FIG. 8 is one embodiment of a system on which a mechanism for profiling user and group accesses to a content repository may operate.

FIG. 8 illustrates one embodiment of a system on which a mechanism for profiling user and group accesses may operate. Within the computer system 800 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or DRAM (RDRAM), etc.), a static memory 806 (e.g., flash memory, static random access memory (SRAM), etc.), and a secondary memory 816 (e.g., a data storage device in the form of a drive unit, which may include fixed or removable computer-readable storage medium), which communicate with each other via a bus 808. Processing device 802 represents one or more general-purpose processing devices such as a microprocessor, hardware processor, central processing unit, or the like.

More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)) connected to the computer system through a graphics port and graphics chipset, an alphanumeric input device 812 (e.g., a keyboard), a cursor control device 814 (e.g., a mouse), and a signal generation device 820 (e.g., a speaker).

The secondary memory 816 may include a machine-readable storage medium (or more specifically a computer-readable storage medium) 824 on which is stored one or more sets of instructions 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media. The instructions 826 may further be transmitted or received over a network 818 via the network interface device 822.

The computer-readable storage medium 824 may also be used to store the instructions 826 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 826, components and other features described herein (for example in relation to FIG. 1) can be implemented as discrete hardware components or integrated in the functionality of hardware components such as ASICS, FPGAs, DSPs or similar devices. In addition, the instructions 826 can be implemented as firmware or functional circuitry within hardware devices. Further, the instructions 826 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "detecting," "generating," "performing," "storing," "updating," "implementing," "determining," "accessing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a mechanism for profiling user and group access to a content repository is described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
identifying, by a processing device, relationships among groups of users in a user directory;
identifying, by the processing device, relationships among folders in a content repository;
receiving, by the processing device, an access log that includes records;
analyzing, by the processing device, the records in the access log to identify similarities between the records based on relationships between the groups of users identified in the records and relationships between folders identified in the records;
using, by the processing device, the identified similarities to determine at least one of an affinity folder or an affinity group, wherein the affinity folder is a folder that is most frequently accessed by a first user group, and wherein the affinity group is a group that most frequently accesses a folder among the folders in the content repository;
calculating, by the processing device, at least one of a user to group distance or a folder to folder distance based on the identified similarities, wherein the folder to folder distance is a distance between a specific folder accessed by the first user group and the affinity folder for the first user group, and the user to group distance is a distance between the first user group accessing the specific folder and the affinity group for the specific folder; and
generating, by the processing device, permissions-recommendations according to the at least one of the user to group distance or the folder to folder distance.

2. The method of claim 1, further comprising:
generating baseline profiles for folder accesses based on the similarities, the generated profiles including proximity deviation thresholds; and
using the baseline profiles for folder accesses to detect user behavior occurring outside the proximity deviation thresholds.

3. The method of claim 2, wherein the proximity deviation thresholds include a distance value indicating a number of folder directory edges traversed between folders being accessed.

4. The method of claim 3, wherein the distance value is weighted according to the similarities between the records based on relationships between folders identified in the records.

5. The method of claim 2, further comprising:
performing a remedial action in response to user behavior occurring outside the proximity deviation thresholds.

6. The method of claim 1, wherein identifying similarities between the records comprises:
clustering distances of groups between the folder accesses;
determining the affinity group for one or more of the folders in the content repository; and
determining the affinity folder for at least one of a given user, a given group or a given organization unit.

7. The method of claim 1, wherein analyzing the records in the access log to identify similarities between the records based on relationships between the groups of users identified in the records and relationships between folders identified in the records, further comprises:
analyzing whether groups are within an organization unit among the groups of users in the user directory; and
applying weights indicating groups are within the organization unit among the groups of users in the user directory.

8. The method of claim 1, wherein analyzing the records in the access log to identify similarities between the records based on relationships between the groups of users identified in the records and relationships between folders identified in the records, further comprises:
analyzing whether the folders are within a volume mount point; and
applying weights indicating the folders are within a same volume mount point.

9. The method of claim 2, wherein generating baseline profiles for folder accesses, further comprises:
generating a baseline profile for at least one of folder read accesses, folder write accesses or folder modify accesses.

10. A method comprising:
receiving, by a processing device, a baseline profile for folder accesses based on identified similarities in records of an access log, wherein the records in the access log are analyzed to identify similarities between the records based on relationships between groups of users identified in the records and relationships between folders identified in the records;
using, by the processing device, the identified similarities to determine at least one of an affinity folder or an affinity group, wherein the affinity folder is a folder most that is most frequently accessed by a first user group, and wherein the affinity group is a group that most frequently accesses a folder among the folders in a content repository;
comparing, by the processing device, to the baseline profile, a new access by a user to a specific folder among the folders in the content repository;
computing, by the processing device, at least one of a user to group distance or a folder to folder distance between the new access and the baseline profile based on the identified similarities from analyzing the records, wherein the user to group distance is a distance between the group that the user belongs to and the affinity group for the specific folder, and the folder to folder distance is a distance between the specific folder and the affinity folder for the user;
detecting, by the processing device, an access deviation based on at least one of the user to group distance or the folder to folder distance; and
performing, by the processing device, a remedial action in response to the detected access deviation.

11. The method of claim 10, wherein performing the remedial action in response to the detected access deviation further comprises:
transmitting an administrator alert in response to the detected access deviation; and removing group permissions to the specific folder.

12. The method of claim 10, wherein computing the folder to folder distance comprises determining a distance between the affinity folder and the specific folder.

13. The method of claim 10, wherein the baseline profile comprises a folder to folder access deviation threshold for determining whether new accesses qualify as access deviations, the method further comprising:
determining whether the computed folder to folder distance exceeds the folder to folder access deviation threshold.

14. The method of claim 10, wherein computing the user to group distance comprises determining a distance between the group that the user belongs to and the affinity group.

15. The method of claim 10, wherein the baseline profile comprises a user to group access deviation threshold for determining whether new accesses qualify as access deviations, the method further comprising:

determining whether the computed user to group distance exceeds the user to group access deviations threshold.

16. The method of claim 10, further comprising:

using weights based on relationships between groups of users in a user directory to calculate distances between new folder accesses and the baseline profile to determine if an access deviation threshold has been met.

17. A system comprising:

processing device;

memory coupled to the processing device, wherein the memory comprises executable instructions that when executed by the processing device, cause the processing device to:

identify relationships among groups of users in a user directory;

identify relationships among folders in a content repository;

receive an access log that includes records;

analyze the records in the access log to identify similarities between the records based on relationships between the groups of users identified in the records and relationships between folders identified in the records;

using the identified similarities to determine at least one of an affinity folder or an affinity group, wherein the affinity folder is a folder that is most frequently accessed by a first user group, and wherein the affinity group is a group that most frequently accesses a folder among the folders in the content repository;

calculate at least one of a user to group distance or a folder to folder distance based on the identified similarities, wherein the folder to folder distance is a distance between a specific folder accessed by the first user group and the affinity folder for the first user group, and the user to group distance is a distance between the first user group accessing the specific folder and the affinity group for the specific folder; and generate permissions-recommendations according to the at least one of the user to group distance or the folder to folder distance.

18. The system of claim 17, wherein the memory coupled to the processing device further comprises executable instructions that when executed by the processing device, cause the processing device to:

generate baseline profiles for folder accesses based on the identified similarities, the generated profiles including proximity deviation thresholds; and use the baseline profiles for folder accesses to detect user behavior occurring outside the proximity deviation thresholds.

19. The system of claim 17, further comprising:

a client device accessing files in the content repository; and an analytics engine application in communication with the client device.

20. The system of claim 19, wherein the analytics engine application further comprises at least one of a permissions component, an anomaly detection component, a clustering component, a recommender component, a distance component, and an endpoint component.

* * * * *